(12) United States Patent
Park et al.

(10) Patent No.: US 12,531,407 B2
(45) Date of Patent: Jan. 20, 2026

(54) FIRE PREVENTION APPARATUS AND OPERATING METHOD THEREOF

(71) Applicant: LG Energy Solution, Ltd., Seoul (KR)

(72) Inventors: Han Gon Park, Daejeon (KR); Won Seok Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 135 days.

(21) Appl. No.: 18/560,506

(22) PCT Filed: Oct. 18, 2022

(86) PCT No.: PCT/KR2022/015799
§ 371 (c)(1),
(2) Date: Nov. 14, 2023

(87) PCT Pub. No.: WO2023/068717
PCT Pub. Date: Apr. 27, 2023

(65) Prior Publication Data
US 2024/0250519 A1    Jul. 25, 2024

(30) Foreign Application Priority Data

Oct. 20, 2021   (KR) .................. 10-2021-0140130

(51) Int. Cl.
*H02H 7/18*        (2006.01)
*H01M 50/383*   (2021.01)

(52) U.S. Cl.
CPC ............ *H02H 7/18* (2013.01); *H01M 50/383* (2021.01)

(58) Field of Classification Search
CPC ............ H02H 7/18; H02H 3/087; H02H 5/04; H01M 50/383; H02J 7/0031; Y02E 60/10; G01R 31/392; G01R 31/389; G01R 31/52

USPC ......................................................... 361/103
See application file for complete search history.

(56) References Cited

U.S. PATENT DOCUMENTS

| | | | |
|---|---|---|---|
| 6,331,763 B1 | 12/2001 | Thomas et al. | |
| 8,174,811 B2* | 5/2012 | Hasunuma | H01M 50/574 |
| | | | 429/61 |
| 12,249,855 B2* | 3/2025 | Wu | H02H 9/026 |
| 2002/0039270 A1* | 4/2002 | Sato | H02H 9/042 |
| | | | 361/58 |

(Continued)

FOREIGN PATENT DOCUMENTS

| | | | |
|---|---|---|---|
| CN | 222867885 U * | 5/2025 | |
| EP | 1181760 B1 | 7/2009 | |

(Continued)

OTHER PUBLICATIONS

International Search Report for PCT/KR2022/015799 mailed Jan. 18, 2023. 3 pages.

(Continued)

*Primary Examiner* — Dharti H Patel
(74) *Attorney, Agent, or Firm* — Lerner David LLP (57) ABSTRACT

Provided is a fire prevention apparatus including a switch connected to a battery through a first line, a variable resistor connected to the switch, a fuse connected to the variable resistor and a second line connecting the battery with a device powered from the battery, a sensor configured to sense information about battery fire, and a controller configured to control the switch and the variable resistor based on the information about the battery fire.

11 Claims, 5 Drawing Sheets

(56) References Cited

U.S. PATENT DOCUMENTS

| | | |
|---|---|---|
| 2002/0079865 A1 | 6/2002 | Thomas et al. |
| 2003/0132732 A1 | 7/2003 | Thomas et al. |
| 2005/0258805 A1 | 11/2005 | Thomas et al. |
| 2007/0159138 A1 | 7/2007 | Furuuchi et al. |
| 2009/0085519 A1 | 4/2009 | Kim |
| 2009/0128094 A1 | 5/2009 | Okuto |
| 2014/0177121 A1 | 6/2014 | Ueno |
| 2015/0132615 A1 | 5/2015 | Yun |
| 2015/0144614 A1* | 5/2015 | Kim .................... H01M 10/486 |
| | | 219/494 |
| 2017/0018817 A1 | 1/2017 | Simmonds et al. |
| 2021/0226468 A1 | 7/2021 | Zagrodnik |
| 2022/0334189 A1 | 10/2022 | Min |
| 2022/0393258 A1 | 12/2022 | Fahad et al. |
| 2024/0275185 A1* | 8/2024 | Kim ..................... H02J 7/0031 |

FOREIGN PATENT DOCUMENTS

| | | |
|---|---|---|
| EP | 3525309 A1 | 8/2019 |
| JP | 2002142353 A | 5/2002 |
| JP | 2006-109596 A | 4/2006 |
| JP | 2014140287 A | 7/2014 |
| KR | 20080082869 A | 9/2008 |
| KR | 20090050932 A | 5/2009 |
| KR | 100929036 B1 | 11/2009 |
| KR | 20150102778 A | 9/2015 |
| KR | 20150121518 A | 10/2015 |
| KR | 20170076354 A | 7/2017 |
| KR | 20180038291 A | 4/2018 |
| KR | 102065735 B1 | 1/2020 |
| KR | 20200137712 A | 12/2020 |
| KR | 20210007245 A | 1/2021 |
| KR | 102283957 B1 | 7/2021 |
| KR | 102312488 B1 | 10/2021 |
| WO | 2015107629 A1 | 7/2015 |
| WO | 2021168327 A1 | 8/2021 |
| WO | WO-2023068717 A1 * | 4/2023 ............... H02H 5/04 |

OTHER PUBLICATIONS

Extended European Search Report including Written Opinion for Application No. 22883940.3 dated Sep. 16, 2024. 8 pgs.

* cited by examiner

FIRE PREVENTION APPARATUS AND OPERATING METHOD THEREOF

CROSS-REFERENCE TO RELATED APPLICATION

The present application is a national phase entry under 35 U.S.C. § 371 of International Application No. PCT/KR2022/015799 filed Oct. 18, 2022, which claims priority from Korean Patent Application No. 10-2021-014013 filed Oct. 20, 2021, all of which are incorporated herein by reference.

TECHNICAL FIELD

Embodiments disclosed herein relate to a fire prevention apparatus and an operating method thereof.

BACKGROUND ART

Recently, research and development of secondary batteries have been actively performed. Herein, the secondary batteries, which are chargeable/dischargeable batteries, may include all of conventional nickel (Ni)/cadmium (Cd) batteries, Ni/metal hydride (MH) batteries, etc., and recent lithium-ion batteries. Among the secondary batteries, a lithium-ion battery has a much higher energy density than those of the conventional Ni/Cd batteries, Ni/MH batteries, etc. Moreover, the lithium-ion battery may be manufactured to be small and lightweight, such that the lithium-ion battery has been used as a power source of mobile devices, and recently, a use range thereof has been extended to power sources for electric vehicles, attracting attention as next-generation energy storage media.

When fire occurs in a battery, generated heat may spread along the wire harness of a device having the battery mounted thereon, leading to larger fire. Devices powered from batteries may be vulnerable to fire, and thus when fire occurs in the battery, a method is required to prevent the fire from spreading to the battery-powered devices.

SUMMARY

Technical Problem

Embodiments disclosed herein aim to provide a fire prevention apparatus and an operating method thereof, in which it is determined whether fire occurs in a battery and it is possible to prevent the fire from spreading to a device powered from the battery, based on a determination result.

Technical problems of the embodiments disclosed herein are not limited to the above-described technical problems, and other unmentioned technical problems would be clearly understood by one of ordinary skill in the art from the following description.

Technical Solution

A fire prevention apparatus according to an embodiment disclosed herein includes a switch connected to a battery through a first line, a variable resistor connected to the switch, a fuse connected to the variable resistor and a second line connecting the battery with a device powered from the battery, a sensor configured to sense information about battery fire, and a controller configured to control the switch and the variable resistor based on the information about the battery fire.

In an embodiment, the controller may be further configured to determine whether the fire occurs in the battery based on the information about the battery fire and control an operation of the switch and a size of the variable resistor based on the determination of whether the battery fire occurs.

In an embodiment, the controller may be further configured to reduce a resistance of the variable resistor when determining that the battery fire occurs, and short the switch.

In an embodiment, the controller may be further configured to reduce the resistance of the variable resistor to allow a current equal to or greater than a rated current to flow in the fuse.

In an embodiment, the first line may be a high-voltage line of the battery, and the second line may be a communication line.

In an embodiment, the switch may be connected between the variable resistor and the battery or between the variable resistor and the fuse.

In an embodiment, the sensor may include at least any one of an illumination sensor and a flame detection sensor.

A method for operating a fire prevention apparatus according to an embodiment disclosed herein includes sensing information about battery fire, determining whether the battery fire occurs in the battery, based on the information about the battery fire, and controlling a switch and a variable resistor based on the determination of whether the battery fire occurs.

In an embodiment, the controlling of the switch and the variable resistor based on the determination of whether the battery fire occurs may include reducing a resistance of the variable resistor when determining that the battery fire occurs, and shorting the switch.

In an embodiment, the reducing of the resistance of the variable resistor and shorting the switch when determining that the battery fire occurs may include reducing the resistance of the variable resistor to allow a current equal to or greater than a rated current to flow in a fuse.

In an embodiment, the operating method may further include disconnecting, by the fuse, a line connecting the battery with a device powered from the battery when the resistance of the variable resistor is reduced and the switch is shorted.

Advantageous Effects

A fire prevention apparatus and an operating method thereof according to an embodiment disclosed herein may determine whether fire occurs in a battery based on information about the fire of the battery and prevent the fire from spreading to a device powered from the battery based on a determination of whether the fire occurs in the battery.

The fire prevention apparatus and the operating method thereof according to an embodiment disclosed herein may adjust a variable resistance and disconnect a fuse by shorting a switch when it is determined that fire occurs in a battery, thereby preventing the fire of the battery from spreading to a device powered from the battery.

Moreover, various effects recognized directly or indirectly from the disclosure may be provided.

DETAILED DESCRIPTION

Hereinafter, embodiments disclosed in this document will be described in detail with reference to the exemplary drawings. In adding reference numerals to components of each drawing, it should be noted that the same components are given the same reference numerals even though they are indicated in different drawings. In addition, in describing the embodiments disclosed in this document, when it is determined that a detailed description of a related known configuration or function interferes with the understanding of an embodiment disclosed in this document, the detailed description thereof will be omitted.

To describe a component of an embodiment disclosed herein, terms such as first, second, A, B, (a), (b), etc., may be used. These terms are used merely for distinguishing one component from another component and do not limit the component to the essence, sequence, order, etc., of the component. The terms used herein, including technical and scientific terms, have the same meanings as terms that are generally understood by those skilled in the art, as long as the terms are not differently defined. Generally, the terms defined in a generally used dictionary should be interpreted as having the same meanings as the contextual meanings of the relevant technology and should not be interpreted as having ideal or exaggerated meanings unless they are clearly defined in the present application.

Figure 1:
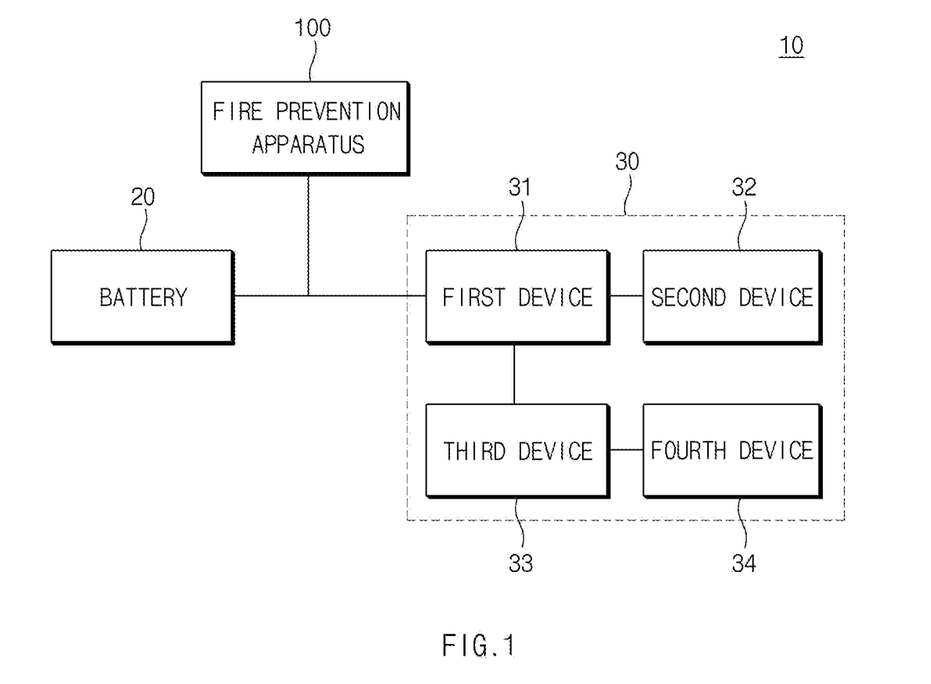
FIG. 1 illustrates a battery-mounted device according to an embodiment disclosed herein.

FIG. 1 illustrates a battery-mounted device according to an embodiment disclosed herein.

Referring to FIG. 1, a battery-mounted apparatus 10 according to an embodiment disclosed herein may include a battery 20, a battery-powered device 30, and a fire prevention apparatus 100.

The battery 20 may be connected to the battery-powered device 30. For example, the battery 20 may supply power to the battery-powered device 30. According to an embodiment, a fuse may be connected to a line to which the battery 20 and the battery-powered device 30 are connected.

The battery 20 may be connected to the fire prevention apparatus 100. For example, the battery 20 may be connected to the fire prevention apparatus 100 through a high-voltage line. According to an embodiment, the fire prevention apparatus 100 may be powered from the battery 20. According to another embodiment, the fire prevention apparatus 100 may be powered from another power supply device that is different from the battery 20.

The battery-powered device 30 may include a plurality of devices 31, 32, 33, and 34. While it is shown in FIG. 1 that the battery-powered device 30 includes the four devices 31, 32, 33, and 34, without being limited thereto, the battery-powered device 30 may include n devices (n is a natural number equal to or greater than 1). According to an embodiment, the battery-powered device 30 may include a controller that perform various functions (e.g., an electronic controller unit (ECU), an microcontroller unit (MCU), etc.). In an embodiment, the battery-powered device 30 may be powered from the battery 20, such that when fire occurs in the battery 20, the fire may spread.

The fire prevention apparatus 100 may prevent the fire from spreading to the battery-powered device 30 when the fire occurs in the battery 20. For example, the fire prevention apparatus 100 may sense information about fire of the battery 20 and determine whether fire occurs in the battery 20 based on the sensed information about the fire of the battery 20. When the fire prevention apparatus 100 determines that fire occurs in the battery 20, the battery 20 and the battery-powered device 30 may be physically disconnected such that the fire occurring in the battery 20 may be prevented from spreading to the battery-powered device 30.

In the battery-mounted apparatus 10 according to an embodiment disclosed herein, when fire occurs in the battery 20, the fire prevention apparatus 100 physically disconnects a line to which the battery and the battery-powered device 30 are connected to prevent generated heat from spreading to the battery-powered device 30 through the line connected to the battery-powered device 30, thereby preventing the fire occurring in the battery 20 from spreading to the battery-powered device 30.

Figure 2:
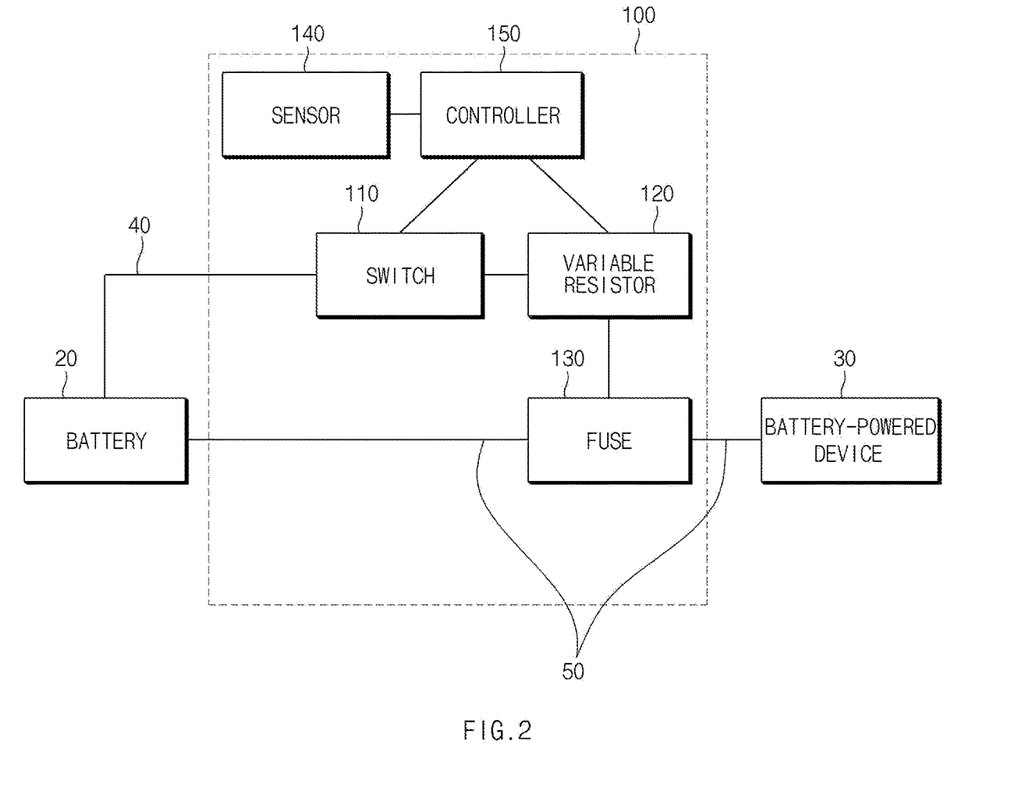
FIG. 2 is a block diagram of a fire prevention apparatus, a battery, and a battery-powered device, according to an embodiment disclosed herein.

FIG. 2 is a block diagram of a fire prevention apparatus, a battery, and a battery-powered device, according to an embodiment disclosed herein.

Referring to FIG. 2, the fire prevention apparatus 100 according to an embodiment disclosed herein may include a switch 110, a variable resistor 120, a fuse 130, a sensor 140, and a controller 150. In an embodiment, the fire prevention apparatus 100 may be substantially the same as the fire prevention apparatus 100 of FIG. 1, the battery 20 may be substantially the same as the battery 20 of FIG. 1, and the battery-powered device 30 may be substantially the same as the battery-powered device 30 of FIG. 1.

The switch 110 may be connected to the battery 20 through a first line 10. For example, the first line 40 may be a high-voltage line of the battery 20. An operation of the switch 110 may be controlled by the controller 150.

The variable resistor 120 may be connected to the switch. For example, like the switch 110, the variable resistor 120 may be connected to the first line 40. A resistance of the variable resistor 120 may be controlled (adjusted) by the controller 150.

While it is shown in FIG. 1 that the switch 110 is connected between the variable resistor 120 and the battery 20, the present disclosure is not limited thereto. For example, the switch 110 may be connected between the variable resistor 120 and the fuse 130.

The fuse 130 may be disconnected when a current equal to or greater than a rated current flows. The fuse 130 may be connected to a second line 50 connecting the battery 20 with the battery-powered device 30. The fuse 130 may be connected to the variable resistor 120 to allow the current to flow through the variable resistor 120 when the switch 110 is shorted.

The sensor 140 may sense information about fire of the battery 20. For example, the sensor 140 may include at least any one of an illumination sensor and a flame detection sensor. In another example, the sensor 140 may sense at least any one of temperature, flame, light, current, voltage and insulation resistance of the battery 20. According to an embodiment, the sensor 140 may transmit the sensed information about the fire of the battery 20 to the controller 150.

The controller 150 may determine whether fire occurs in the battery 20 based on the information about the fire of the battery 20. For example, the controller 150 may determine whether fire occurs in the battery 20 based on at least any one of the information about the fire of the battery 20, sensed by the sensor 140.

The controller 150 may control the switch 110 and the variable resistor 120. For example, the controller 150 may control an operation of the switch 110 and control (or adjust) a resistance of the variable resistor 120.

The controller 150 may control the switch 110 and the variable resistor 120 based on whether fire occurs in the battery 20. For example, when the controller 150 determines that fire occurs in the battery 20, the controller 150 may short the switch 110 and reduce a resistance of the variable resistor 120. According to an embodiment, the controller 150 may reduce the resistance of the variable resistor 120 to allow a current equal to or greater than the rated current to flow in the fuse 130.

When the controller 150 shorts the switch 110 and reduces the resistance of the variable resistor 120, current may flow in the fuse 130 through the first line 40 of the battery 20. The fuse 130 may disconnect the second line 50 when high current flows, such that when the switch 110 is shorted and the resistance of the variable resistor 120 is reduced, the current equal to or greater than the rated current flows in the fuse 130 through the first line 40 that is a high-voltage line of the battery 20, resulting in disconnection of the second line 50. Thus, when it is determined that fire occurs in the battery 20, the fuse 130 may disconnect the second line 50 that is a line connected to the battery-powered device 30.

In the fire prevention apparatus 100 according to an embodiment disclosed herein, the controller 150 may determine whether fire occurs in the battery 20 based on information about fire of the battery 20 sensed by the sensor 140. When the controller 150 determines that the fire occurs in the battery 20, the controller 150 may short the switch 110 and reduce the resistance of the variable resistance 120, thereby disconnecting the fuse 130 by allowing the current equal to or greater than rated current to flow through the first line 40. Thus, when the fire occurs in the battery 20, the fire prevention apparatus 100 may prevent heat or fire from spreading to the battery-powered device 30 by disconnecting the second line 50 in the fuse 130.

Figure 3:
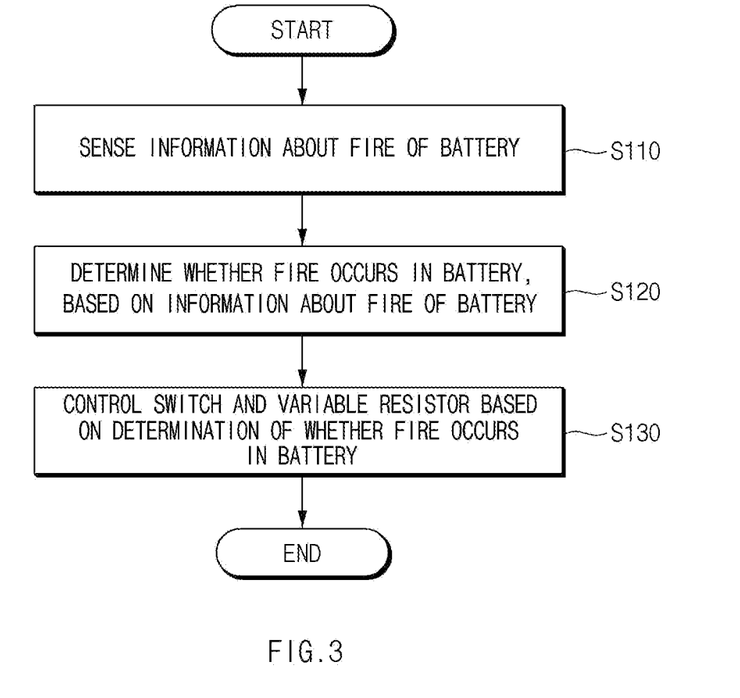
FIG. 3 is a flowchart of an operating method of a fire prevention apparatus according to an embodiment disclosed herein.

FIG. 3 is a flowchart of an operating method of a fire prevention apparatus according to an embodiment disclosed herein.

The operating method may include operation S110 of sensing information about fire of a battery, operation S120 of determining whether the fire occurs in the battery based on the information about the fire of the battery, and operation S130 of controlling a switch and a variable resistor based on a determination of whether the fire occurs in the battery.

In operation S110 of sensing the information about the fire of the battery, the sensor 140 may sense the information about the fire of the battery. For example, the sensor 140 may include at least any one of an illumination sensor and a flame detection sensor. In another example, the sensor 140 may sense at least any one of temperature, flame, light, current, voltage and insulation resistance of the battery. According to an embodiment, the sensor 140 may transmit the sensed information about the fire of the battery to the controller 150.

In operation S120 of determining whether the fire occurs in the battery based on the information about the fire of the battery, the controller 150 may determine whether the fire occurs in the battery based on the information about the fire of the battery sensed by the sensor 140. For example, the controller 150 may determine whether the fire occurs in the battery based on at least any one of temperature, flame, light, current, voltage and insulation resistance of the battery.

In operation S130 of controlling the switch and the variable resistor based on the determination of whether the fire occurs in the battery, the controller 150 may control the switch 110 and the variable resistor 120 based on the determination of whether the fire occurs in the battery. For example, the controller 150 may control an operation of the switch 110 and control (or adjust) a resistance of the variable resistor 120.

Figure 4:
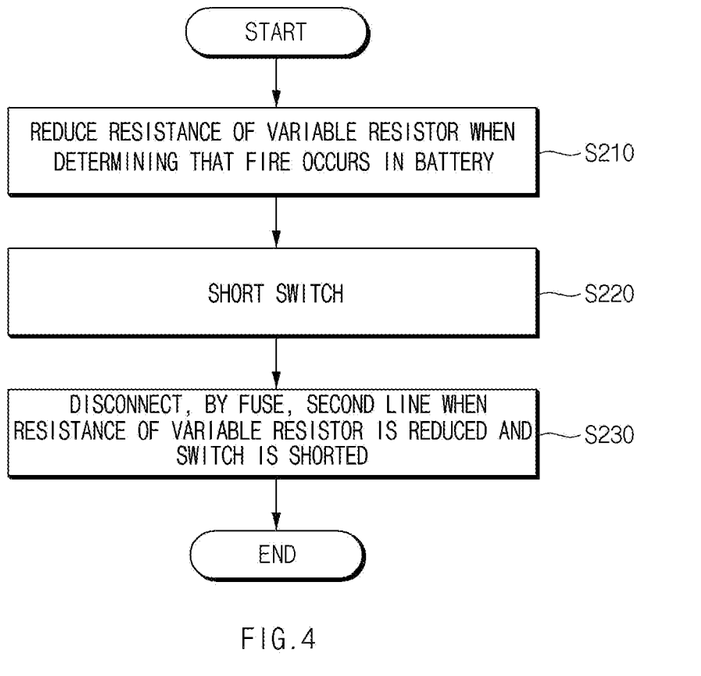
FIG. 4 is a flowchart showing in detail an operating method of a fire prevention apparatus according to an embodiment disclosed herein.

FIG. 4 is a flowchart showing in detail an operating method of a fire prevention apparatus according to an embodiment disclosed herein.

Referring to FIG. 4, the operating method may include operation S210 of reducing a resistance of a variable resistor when determining that fire occurs in a battery, operation S220 of shorting a switch, and operation S230 of disconnecting a second line by a fuse when the resistance of the variable resistor is reduced and the switch is shorted. In an embodiment, operations S210 and S220 may be included in operation S130 of FIG. 3.

In an embodiment, the switch 110 may be connected to a first line of the battery, the variable resistor 120 may be connected to the switch 110, the fuse 130 may be connected to a second line between the battery and a battery-powered device, and current may flow in the fuse 130 through the variable resistor 120 when the switch 110 is shorted.

In operation S210 of reducing the resistance of the variable resistor when determining that the fire occurs in the battery, the controller 150 may reduce the resistance of the variable resistor when determining that the fire occurs in the battery. For example, when the resistance of the variable resistor is reduced, a load of the first line may be reduced and thus a current equal to or greater than a rated current may flow. According to an embodiment, the first line may be a high-voltage line of the battery.

According to an embodiment, in operation S210, the controller 150 may adjust a size of the variable resistor to allow the current equal to or greater than the rated current to flow in the fuse 130.

In operation S220 of shorting the switch, the controller 150 may short the switch 110. For example, when the switch 110 is shorted, the current may flow in the first line and the current flowing in the first line may be applied to the fuse 130.

In operation S230 of disconnecting the second line by the fuse when the resistance of the variable resistor is reduced and the switch is shorted, the fuse 130 may disconnect the second line when the resistance of the variable resistor 120 is reduced and the switch 110 is shorted. For example, the fuse 130 may physically disconnect the second line when high current flows therein, such that the resistance of the variable resistor 120 is reduced and the high current flows, which shorts the switch 110, and thus the fuse 130 may disconnect the second line. According to an embodiment, the second line may be a line (e.g., a communication line or a power supply line) to which the battery and the battery-powered device are connected.

Figure 5:
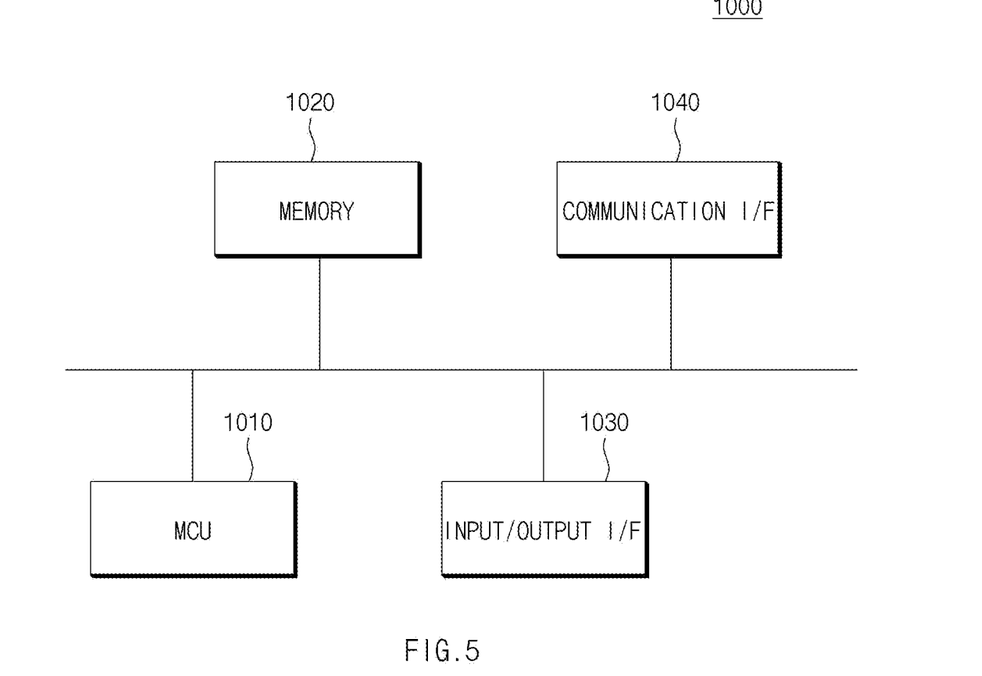
FIG. 5 is a block diagram of a hardware configuration of a computing system for performing an operating method of a fire prevention apparatus, according to an embodiment disclosed herein.

FIG. 5 is a block diagram of a hardware configuration of a computing system for performing an operating method of a fire prevention apparatus, according to an embodiment disclosed herein.

Referring to FIG. 5, a computing system 1000 according to an embodiment disclosed herein may include an MCU 1010, a memory 1020, an input/output I/F 1030, and a communication I/F 1040.

The MCU 1010 may be a processor that executes various programs (e.g., a program for sensing information about fire of a battery, a program for determining whether fire occurs in the battery, a program for controlling a switch and a variable resistor, etc.) stored in the memory 1020, processes various information including the information about the fire of the battery, etc., and executes the above-described functions of the fire prevention apparatus shown in FIG. 2.

The memory 1020 may store various programs regarding log information collection and diagnosis of the battery, etc. Moreover, the memory 1020 may store various information such as a current or a voltage of the battery pack, etc.

The memory 1020 may be provided in plural, depending on a need. The memory 1020 may be volatile memory or non-volatile memory. For the memory 1020 as the volatile memory, random access memory (RAM), dynamic RAM (DRAM), static RAM (SRAM), etc., may be used. For the memory 1020 as the nonvolatile memory, read only memory (ROM), programmable ROM (PROM), electrically alterable ROM (EAROM), erasable PROM (EPROM), electrically erasable PROM (EEPROM), flash memory, etc., may be used. The above-listed examples of the memory 1020 are merely examples and are not limited thereto.

The input/output I/F 1030 may provide an interface for transmitting and receiving data by connecting an input device (not shown) such as a keyboard, a mouse, a touch panel, etc., and an output device such as a display (not shown), etc., to the MCU 1010.

The communication I/F 1040, which is a component capable of transmitting and receiving various data to and from a server, may be various devices capable of supporting wired or wireless communication. For example, the fire prevention apparatus may transmit and receive a relay control program included in a battery pack or information such as a current or a voltage of various battery packs and information about whether fire occurs in a battery from an external server separately provided through the communication I/F 1040.

As such, a computer program according to an embodiment disclosed herein may be recorded in the memory 1020 and processed by the MCU 1010, thus being implemented as a module that performs functions shown in FIG. 2.

The above description is merely illustrative of the technical idea of the present disclosure, and various modifications and variations will be possible without departing from the essential characteristics of embodiments of the present disclosure by those of ordinary skill in the art to which the embodiments disclosed herein pertains.

Therefore, the embodiments disclosed herein are intended for description rather than limitation of the technical spirit of the embodiments disclosed herein and the scope of the technical spirit of the present disclosure is not limited by these embodiments disclosed herein. The protection scope of the technical spirit disclosed herein should be interpreted by the following claims, and all technical spirits within the same range should be understood to be included in the range of the present disclosure.

The invention claimed is:

1. A fire prevention apparatus comprising:
a switch connected to a battery through a first line;
a variable resistor connected to the switch;
a fuse positioned on a second line connecting the battery with a device powered from the battery, wherein the fuse is electrically connected to the variable resistor separately from the second line;
a sensor configured to sense information about battery fire; and
a controller configured to control the switch and the variable resistor based on the information about the battery fire.

2. The fire prevention apparatus of claim 1, wherein the controller is further configured to determine whether the battery fire occurs based on the information about the battery fire and control an operation of the switch and a size of the variable resistor based on the determination of whether the battery fire occurs.

3. The fire prevention apparatus of claim 2, wherein the controller is further configured to reduce a resistance of the variable resistor when determining that the battery fire occurs, and short the switch.

4. The fire prevention apparatus of claim 3, wherein the controller is further configured to reduce the resistance of the variable resistor to allow a current equal to or greater than a rated current to flow in the fuse.

5. The fire prevention apparatus of claim 1, wherein the first line is a high-voltage line of the battery, and the second line is a communication line.

6. The fire prevention apparatus of claim 1, wherein the switch is connected between the variable resistor and the battery or between the variable resistor and the fuse.

7. The fire prevention apparatus of claim 1, wherein the sensor comprises at least any one of an illumination sensor and a flame detection sensor.

8. An method for operating a fire prevention apparatus, the method comprising:
sensing information about battery fire;
determining whether the battery fire occurs, based on the information about the battery fire; and
controlling a switch, a variable resistor, and a current flowing into a fuse positioned on a second line connecting the battery with a device powered from the battery based on the determination of whether the battery fire occurs, wherein the switch is connected to the battery through a first line and the fuse is electrically connected to the variable resistor separately from the second line.

9. The method of claim 8, wherein the controlling of the switch and the variable resistor based on the determination of whether the battery fire occurs comprises:
reducing a resistance of the variable resistor when determining that the battery fire occurs; and
shorting the switch.

10. The method of claim 9, wherein the reducing of the resistance of the variable resistor and shorting the switch when determining that the battery fire occurs comprises reducing the resistance of the variable resistor to allow a current equal to or greater than a rated current to flow in the fuse.

11. The method of claim 10, further comprising disconnecting, by the fuse, a line connecting the battery with a device powered from the battery when the resistance of the variable resistor is reduced and the switch is shorted.

* * * * *